UNITED STATES PATENT OFFICE.

THADDEUS HYATT, OF PHILADELPHIA, PENNSYLVANIA.

IMPROVEMENT IN THE PREPARATION OF COFFEE.

Specification forming part of Letters Patent No. 53,250, dated March 13, 1866.

*To all whom it may concern:*

Be it known that I, THADDEUS HYATT, a citizen of the United States, now residing at Philadelphia, have discovered a new and useful improvement in coffee, by which its aromatic force is largely increased, and which I call "oil-developed coffee," of which the following is a specification.

By the common method coffee is roasted dry—that is, without any appearance of oil—the prevailing theory on this subject being that when the oil comes the coffee is lost, for the idea is that the oil is foreign to the coffee, and therefore injurious. My discovery is that, so far from this being the case, the whole aromatic force of the coffee depends upon it; that when roasted dry, although the oil is not seen, it still exists, but in diminished quantity; that the aroma of the coffee is developed *pari passu* with this very oil, and that the value of coffee commercially and as a beverage is exactly in the ratio of its development. The mistake concerning it arises from ignorance of the nature of coffee, two elements in which give the beverage its peculiar character—viz., caramel, into which the saccharine materials of the coffee are changed by the roasting process, and which gives body and color to the liquid, and aromatic oil, which imparts its fragrance to the caramel. These two in combination make up or constitute what we call the "flavor" of the coffee. What the proportions of each to the other are is not known; but this much is known, that when all the oil of the coffee is liberated the proportions are not right, and it is this derangement of the aromatic equilibrium that gives rise to the saying that "the coffee is lost."

To remedy this apparent evil mankind has resorted to the plan of developing only a portion of the oil, and this with no standard, except color, to determine when just enough has been formed. Owing to this practice, poor coffee is the rule and good coffee the exception, while the waste and loss of the virtue of the coffee are enormous; but the Turk pounds his coffee, thus harmonizing the uncertainties of the roasting, for pounding, which extracts oil from seeds, also makes active the oil of the coffee, which has been but partially developed by the heat. The superiority of pounded coffee arises, then, from the circumstance that this method develops oil and, by consequence, aroma, which grinding does not do.

The changing shades of color which coffee assumes during the roasting indicates the formation of both caramel and oil, but not until the latter is absolutely set free, so as to appear upon the whole surface of the bean as a coating, is the full force of the aroma of the coffee brought out. That when thus developed it should be too powerful is a good reason for adding caramel, but a poor reason for neglecting to develop it. The former is my method and the latter the one in general use, the difference between the two systems amounting in beverage to more than two for one, and in money to over one hundred millions of dollars a year, or a sum that equals the yearly value of the entire coffee crop of the world. The yearly waste which has thus taken place for upward of two hundred years has exceeded the yearly consumption, and if computed upon the basis of twenty cents a pound would amount, at the lowest estimate, to more than one thousand millions of dollars, and at the present rate of consumption, if continued for two centuries longer, would amount to twenty thousand millions more.

My discovery being that the aromatic force of the coffee is exactly in proportion to its oil development, my invention consists in fully developing this oil, so that coffee which is roasted upon my plan, instead of being dry, is absolutely wet or greasy with its own oil. This I accomplish by simply heating the grains sufficiently. By the ordinary practice of roasting this result would be obtained if the final heat were conserved; but the universal practice is to cool the coffee at the last moment purposely to prevent the oil from making its appearance.

If, instead of this cooling the coffee, it were thrown in bulk into a close vessel, the heat already in it would develop the whole of the oil; but my method of roasting is to place in the roasting-cylinder not more than about one-fifth the usual quantity of green coffee, thus increasing the relative volume of hot air, and so reducing the time required to roast it. By thus increasing the volume of hot air the coffee may be roasted in three minutes, and even in one, in which case the different stages of the roasting process are distinctly marked by successive reports of the grains, like popped corn, and the crisis or time for removing the coffee from the fire is indicated by what appears to be a general discharge of the coffee "artillery." The coffee must then be removed without loss of time and emptied from the cylinder, when its color will be found to be about like that of chocolate, and every grain will also be glossy with oil.

Having thus fully disclosed the nature of my discovery, what I claim as my invention, and desire to secure by Letters Patent, is—

As a new manufacture, oil-developed coffee, substantially as and for the purposes herein described.

THADDEUS HYATT.

Witnesses:
A. W. SCHARIT,
L. G. HARVEY.